United States Patent
Kaplinger et al.

(10) Patent No.: US 9,189,405 B2
(45) Date of Patent: *Nov. 17, 2015

(54) PLACEMENT OF DATA IN SHARDS ON A STORAGE DEVICE

(75) Inventors: Todd E. Kaplinger, Raleigh, NC (US);
Nitin Gaur, Round Rock, TX (US);
Kulvir Singh Bhogal, Pflugerville, TX (US); Christopher Douglas Johnson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/197,391

(22) Filed: Aug. 3, 2011

(65) Prior Publication Data

US 2013/0036269 A1      Feb. 7, 2013

(51) Int. Cl.
 *G06F 12/00* (2006.01)
 *G06F 12/08* (2006.01)
 *G06F 3/06* (2006.01)

(52) U.S. Cl.
 CPC ............ *G06F 12/0866* (2013.01); *G06F 3/061* (2013.01); *G06F 3/064* (2013.01); *G06F 3/0689* (2013.01); *G06F 2212/217* (2013.01)

(58) Field of Classification Search
 None
 See application file for complete search history.

(56) References Cited

U.S. PATENT DOCUMENTS

| | | | |
|---|---|---|---|
| 6,944,715 B2 | 9/2005 | Britton et al. | |
| 7,136,883 B2 * | 11/2006 | Flamma et al. | 1/1 |
| 7,529,903 B2 | 5/2009 | Boss et al. | |
| 7,568,068 B2 * | 7/2009 | Kulkarni et al. | 711/113 |
| 7,765,167 B2 | 7/2010 | Prahlad et al. | |
| 7,778,972 B1 | 8/2010 | Cormie | |
| 2003/0046270 A1 | 3/2003 | Leung | |
| 2003/0140207 A1 * | 7/2003 | Nagase et al. | 711/167 |
| 2004/0230753 A1 * | 11/2004 | Amiri et al. | 711/147 |
| 2006/0004957 A1 * | 1/2006 | Hand et al. | 711/113 |
| 2009/0187711 A1 * | 7/2009 | Amarendran et al. | 711/117 |
| 2011/0040937 A1 * | 2/2011 | Augenstein et al. | 711/117 |
| 2012/0221768 A1 * | 8/2012 | Bagal et al. | 711/103 |

OTHER PUBLICATIONS

Canadian Intellectual Property Office,, International Application No. PCT/CA2012/050498 International Search Report dated Nov. 28, 2012, pp. 1-3.

Rahman et al., "Study of Different Replica Placement and Maintenance Strategies in Data Grid", Seventh IEEE International Symposium on Cluster Computing and the Grid (CCGrid'07), 2007, pp. 171-178.

\* cited by examiner

*Primary Examiner* — Daniel Tsui

(74) *Attorney, Agent, or Firm* — Moore & Van Allen, PLLC

(57) ABSTRACT

A method, system and computer program product for placing data in shards on a storage device may include determining placement of a data set in one of a plurality of shards on the storage device. Each one of the shards may include a different at least one performance feature. Each different at least one performance feature may correspond to a different at least one predetermined characteristic associated with a particular set of data. The data set is cached in the one of the plurality of shards on the storage device that includes the at least one performance feature corresponding to the at least one predetermined characteristic associated with the data set being cached.

18 Claims, 2 Drawing Sheets

PLACEMENT OF DATA IN SHARDS ON A STORAGE DEVICE

BACKGROUND

Aspects of the present invention relate to caching data on a storage device, and more particularly to a method, system and computer program product for placement of data in shards on a caching appliance or other data storage device.

Data storage devices, such as a caching appliance or other storage device may be partitioned using different types of data storage units which may have different performance characteristics for storing different types or sets of data. The different types or sets of data that may have different requirements, such as persistence, accessibility or other characteristics. Multiple copies of the same software version may be stored on the different data storage units of a caching appliance or storage device. Vertical clustering refers to the practice of defining cluster members on the same physical machine, for example an application server. Experience has shown that a single application server which is implemented by a single Java Virtual Machine (JVM) process cannot always fully utilize the processor power and random access memory (RAM) of a large multiprocessor machine. Clustering with vertical cluster members provides a straightforward mechanism to create multiple JVM processes that together can fully utilize all the processing power and memory available. One drawback to clustering solutions is that they do not account for where the placement of these JVM processes or installations persist their run time related data. With respect to caching appliances and specifically caching data, there is a need for optimization with regard to where the data is persisted, how frequently the data is accessed and what the actual throughput is when accessing the data. There may also be Service Level Agreements that specify requirements with regard to persistence of the data, access speed, throughput when accessing the data as well as other performance characteristics or requirements.

BRIEF SUMMARY

According to one aspect of the present invention, a method for placing data in shards on a storage device may include determining placement of a data set in one of a plurality of shards on the storage device. Each one of the shards may include a different at least one performance feature. Each different at least one performance feature may correspond to a different at least one predetermined characteristic associated with a particular set of data. The data set is cached in the one of the plurality of shards on the storage device that includes the at least one performance feature corresponding to the at least one predetermined characteristic associated with the data set being cached.

According to another aspect of the present invention, a system may include a storage device for storing data. The storage device may include a plurality of shards. Each one of the shards may include a different at least one performance feature. Each different at least one performance feature may correspond to a different at least one predetermined characteristic associated with a particular set of data. A data set is cached in the one of the plurality of shards on the storage device that includes the at least one performance feature corresponding to the at least one predetermined characteristic associated with the data set being cached.

According to a further aspect of the present invention, a computer program product for placing data in shards on a storage device may include a computer readable storage medium having computer readable program code embodied therewith. The computer readable program code may include computer readable program code configured to determine placement of a data set in one of a plurality of shards on the storage device. Each one of the shards may include a different at least one performance feature. Each different at least one performance feature may correspond to a different at least one predetermined characteristic associated with a particular set of data. The computer readable program code may also include computer readable program code configured to cache the data set in the one of the plurality of shards on the storage device that includes the at least one performance feature corresponding to the at least one predetermined characteristic associated with the data set being cached.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
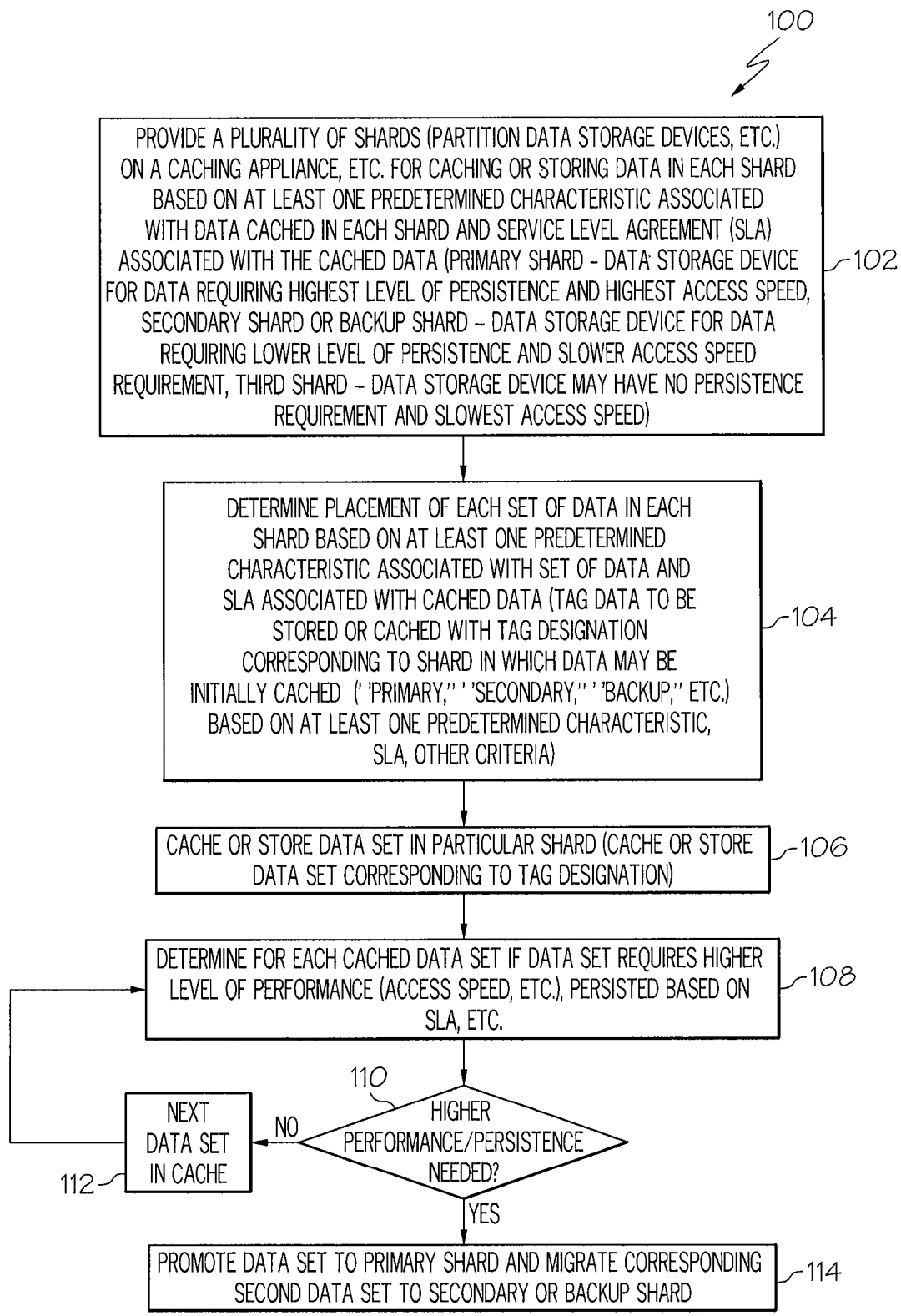
FIG. 1 is flowchart of an example of a method for shard placement on a caching appliance or other data storage device in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In accordance with an aspect of the invention, a determination for proper placement of persisted data on a storage device or caching appliance may be performed taking into account the performance features of each of a plurality of shards or data storage units or entities on the storage device. The determination of the proper placement of the persisted data may take into account predetermined characteristics associated with the data and any requirements of a Service Level Agreement (SLA), such as levels or degrees of persistence, access speeds, throughput and other performance characteristics. Caching appliances and other data storage devices may provide various levels of persistence ranging from in memory only (RAM, etc.) to persisting to a disk or hard drive. Each of these various data storage units or components has an associated cost whether in terms of the actual cost to purchase the storage unit to speed of accessing the data and various combinations of such cost in between. Runtime characteristics of a running caching appliance may be leveraged to determine which model or combination of data storage units associated with a caching appliance or other storage device may best suit the data persistence and access requirements of an application along with the requirements of any SLA that may be associated with the application.

FIG. 1 is flowchart of an example of a method 100 for shard placement on a caching application or other storage device in accordance with an embodiment of the present invention. In block 102, a plurality of shards may be provided on the caching appliance. Each shard may be a different type of data storage device or unit including different performance features. Shards are a common means for partitioning data in a caching appliance or other type data storage device. Examples of the different performance features of each shard may include a level or degree of persistence, speed of accessing the data, actual throughput when accessing the data and any other performance features that may be of importance based on the application associated with the caching appliance or that may be specified as performance criteria in a SLA.

The plurality of shards may include a primary shard and a secondary or backup shard. The primary shard may be a data storage device or unit for data requiring a highest level of persistence and highest access speed and throughput. The primary shard may be shard that an application accesses first to obtain the requested data. The secondary shard or backup shard may be a data storage device or unit for data requiring a lower level of persistence and a slower access speed and throughput requirement. The secondary shard is typically a less expensive data storage device compared to the primary shard and will usually only be needed when the primary shard is unavailable. A third shard may be included which may be a data storage device or unit that may have no persistence requirement and a slower access speed and throughput compared to the primary shard and secondary or backup shard. The third shard will typically be the least expensive data storage device and will only be accessed when the primary and secondary shards are unavailable. Accordingly, the primary and secondary shards will occupy the premium space with higher performance characteristics or features with respect to memory access for persisted data to be accessed by an application.

Accordingly, each shard may include different performance features and each different performance feature may correspond to a different predetermined characteristic associated with a particular set of data that may be cached on the caching appliance and that may be required by a SLA. The performance features and corresponding predetermined characteristics associated with the particular set of data may include a predefined level of persistence, a predefined access speed for accessing the data, a predefined throughput or other predefined characteristics.

In block 104, a determination may be made for placement of each data set in one of the plurality of shards based on the performance features of the shard corresponding to the predetermined characteristic associated with the data being cached along with any SLA requirements.

In accordance with one aspect of the invention, each data set may be tagged with a tag designation before caching. The tag designation may correspond to the one of the plurality of shards in which the data set is to be cached. Each data set may be tagged based on the predetermined characteristic or characteristics associated with the data set and any requirements associated with a SLA or other predefined criteria. Accordingly, each data set may be tagged with a tag designation for caching the data set in one of a primary shard, a secondary or backup shard or another shard based on the predetermined characteristic or characteristics associated with the data set and any requirements associated with the SLA or other predefined operational criteria.

In block 106, the data set may be cached in the particular shard that has the performance feature or features corresponding to the characteristic or characteristics associated with the data being cached as may be required by a SLA or other predefined operational criteria.

In block 108, a determination may be made for each cached data set if the data set requires a higher level of performance, such as the data set needs to be persisted or needs a higher level of persistence, a faster access speed or other enhanced performance characteristic based on the SLA or other criteria. In block 110, if the determination was made that the data set does not need a higher level of performance or the data did not need to be persisted, the method 100 may consider the next that data set in the caching appliance in block 112 and the method 100 may return to block 108. The method 100 may then proceed as previously described.

If a determination is made in block 110 that a higher level of performance or that the data set needs to be persisted or a higher level of persistence is needed, the method 100 may advance to block 114. In block 114, the data set may be promoted to the primary shard or a shard that performs at a higher level of performance. A secondary data set corresponding to the promoted data set may be migrated to the secondary or backup shard or to the next higher level shard from where the secondary data set is currently cached.

Figure 2:
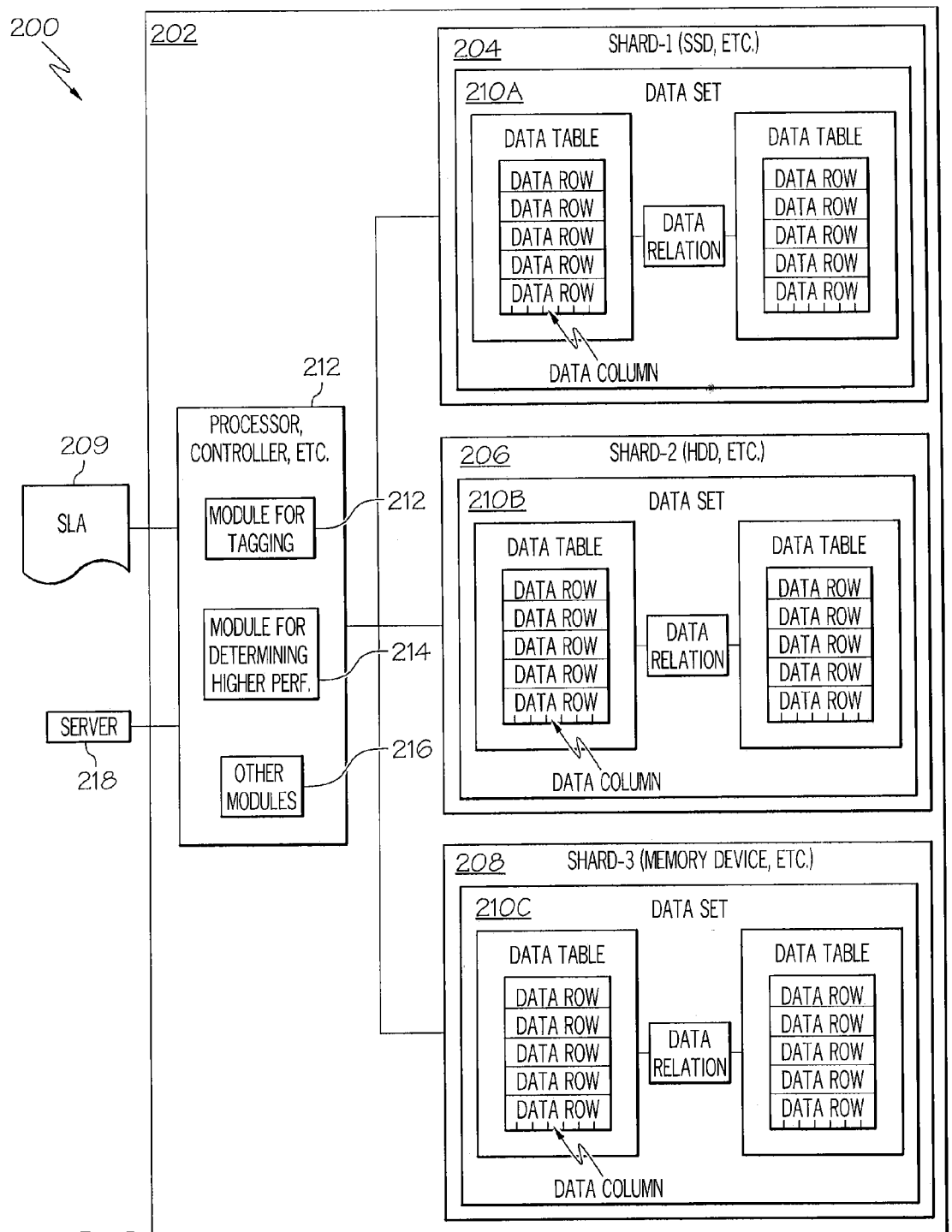
FIG. 2 is a block schematic diagram of an example of a system including a plurality of shards on a caching appliance in accordance with an embodiment of the present invention.

FIG. 2 is a block schematic diagram of an example of a system 200 including a caching appliance 202 or other data storage device in accordance with an embodiment of the present invention. An example of the caching appliance 202 may be an IBM WebSphere DataPower XC10 caching appliance or a similar caching appliance including multiple shards. IBM, WebSphere and DataPower are trademarks of International Business Machines, Inc. in the United States, other countries or both.

The caching appliance 202 may include a plurality of shards. In the example shown in FIG. 2, the caching appliance 202 may include a primary shard or shard-1, 204 a secondary shard or shard-2 206 and a third shard, shard-3 208. Each shard may include a data storage unit or entity that has its own performance characteristics that may be different from each of the other shards. As previously discussed, each of the shards 204, 206 and 208 may have different performance characteristics for caching data sets with associated operational characteristics based on a SLA 209 or other criteria that may correspond to the different performance characteristics of each of the shards 204, 206 and 208.

For example, the first shard 204 may be a solid state drive. The second shard 206 may be a basic hard disk drive and the third shard 208 may be a memory device, such as RAM or other memory. Based on performance features or characteristics of each of these data storage units and a SLA or other performance criteria, the shards 204, 206 and 208 may be designated as primary and secondary or backup based on the relative performance features of each of the devices. For example, the solid state drive, first shard 204, provides access speeds similar to the memory, third shard 208, but also provides a level of persistence similar to the hard disk drive, second shard 206. The downside is the cost of the solid state drive is more expensive than a traditional hard disk especially when the size of the disk is considered.

In the example illustrated in FIG. 2, the initial placement of the primary shard may be on the hard disk, shard-2 206. The reason for doing this may simply be that the hard disk provides the lowest common denominator of speed, size and efficiency. Shard-3 208, the memory, may be the secondary or backup shard. Over a period of time, a determination may be made that the data set 210b cached or stored on the hard disk drive, shard-2 206, needs a higher level of performance and also needs to be persisted based on the predefined SLA or other predefined criteria. The corresponding data set 210a cached in shard-1 204 may be promoted to primary and the data set in shard-2 206 may be migrated to secondary or backup since even the secondary shard or data set in the secondary shard needs to be persisted which shard-3 208, the memory, does not provide. This process may be continued for each data set that is cached in the caching appliance 202.

The system 200 may also include a processor 212 or controller for controlling operation of the caching appliance 202. The method 100 or portions of the method 100 described with reference to FIG. 1 may be embodied on or performed by the processor or controller 212. The processor or controller 212 may include a module for tagging 212, a module for determining if a data set requires a higher performing shard 214 and other modules 216. The module for tagging 212 may perform operations similar to those described with reference to block 104 of FIG. 1. The module 214 for determining if a data set requires a higher performing shard may perform operations similar to those described with reference to blocks 108, 110, 112 and 114 of FIG. 1.

The SLA 209, or information or operating requirements from the SLA 209 may be used by the processor or controller 212 for performing the operations described herein.

A server 218 may be coupled to the caching appliance 202. The server 218 may run applications or programs that may access the data sets 210a-210c cached on the shards 204-208 of the caching appliance 202.

The layout and design illustrated in FIG. 2 is for purposes of explaining the present invention and the present invention is not limited to any particular design.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system, comprising:
    a storage appliance for storing data;
    a plurality of shards on the storage appliance, wherein each one of the shards comprises a different type of storage device including a different at least one performance feature, each different at least one performance feature of the different types of storage devices corresponding to a different at least one predetermined characteristic associated with a particular set of data, wherein the plurality of shards comprises:
        a first shard named a primary shard; and
        a second shard named a secondary shard, wherein the at least one performance feature of the primary shard comprises a higher level persistence and a faster data access speed than the at least one performance feature of the secondary shard;
    a module for tagging a data set with a particular tag designation of a plurality of tag designations before caching, the particular tag designation identifying one of the plurality of shards by name in which the data set is to be cached based on the at least one predetermined characteristic associated with the data set, the plurality of tag designations each identifying one of the plurality of shards by a different name; and
    wherein the data set is cached in a particular one of the plurality of shards on the storage appliance based on the tag designation, the at least one performance feature of the particular one of the plurality of shards corresponding to the at least one predetermined characteristic associated with the data set being cached.

2. The system of claim 1, further comprising a processor for determining placement of the data set in the particular one of the plurality of shards based on the at least one performance feature corresponding to the at least one predetermined characteristic associated with the data set and a requirement of a service level agreement.

3. The system of claim 1, wherein the plurality of shards comprises a third shard, wherein the at least one performance feature of the secondary shard comprises a higher level persistence and a faster data access speed than the at least one performance feature of the third shard.

4. The system of claim 1, wherein the data set is cached in response to the tag designation.

5. The system of claim 1, wherein the data set is tagged for caching in one of a primary shard and a secondary shard based on the at least one predetermined characteristic associated with the data set.

6. The system of claim 1, wherein the data set is tagged based on at least one of the at least one predetermined characteristic associated with the data set and a requirement associated with a service level agreement.

7. The system of claim 1, wherein the data set is tagged for caching in one of the primary shard, the secondary shard and another shard based at least on the at least one predetermined characteristic associated with the data set and the requirement associated with the service level agreement.

8. The system of claim 7, wherein at least one of the predetermined characteristic associated with the data set and the requirement of the service level agreement comprise at least one of a predefined level of persistence and a predefined speed for accessing the data set cached on the storage appliance and wherein the primary shard comprises a higher level of persistence and a higher access speed than the secondary shard.

9. The system of claim 1, further comprising a module for determining if the data set requires a higher level of performance than a level of performance of the one of the plurality of shards in which the data set is currently cached, the data set being promoted to a shard of the plurality of shards that performs at the higher level of performance than a shard in which the data set is currently cached in response to the determination that the data set requires the higher level of performance, and a secondary data set corresponding to the promoted data set being migrated to a next higher level performing shard than a shard in which the secondary data is currently cached, wherein the shard to which the secondary data set is promoted performs at a lower level than the shard to which the promoted data set is migrated.

10. A computer program product for placing data in shards on a storage device, the computer program product comprising:
    a non-transitory computer readable storage medium having computer readable program code embodied therewith, the computer readable program code comprising:
    computer readable program code configured to determine placement of a data set in one of a plurality of shards on the storage appliance, wherein each one of the shards comprises a different type of storage device including a different at least one performance feature, each different at least one performance feature of the different types of storage devices corresponding to a different at least one predetermined characteristic associated with a particular set of data, wherein the plurality of shards comprises:
a first shard named a primary shard; and
a second shard named a secondary shard, wherein the at least one performance feature of the primary shard comprises a higher level persistence and a faster data access speed than the at least one performance feature of the secondary shard;
computer readable program code configured to tag the data set with a particular tag designation of a plurality of tag designations before caching, the tag designation identifying one of the plurality of shards by name in which the data set is to be cached based on the at least one predetermined characteristic associated with the data set, the plurality of tag designations each identifying one of the plurality of shards by a different name; and
computer readable program code configured to cache the data set in a particular one of the plurality of shards on the storage appliance based on the tag designation, the at least one performance feature of the particular one of the plurality of shards corresponding to the at least one predetermined characteristic associated with the data set being cached.

11. The computer program product of claim 10, wherein the computer readable program code further comprises computer readable program code configured to determine placement of the data set in the particular one of the plurality of shards based on the at least one performance feature corresponding to the at least one predetermined characteristic associated with the data set and a requirement of a service level agreement.

12. The computer program product of claim 10, wherein the computer readable program code further comprises computer readable program code configured to cache the data set in the particular one of the plurality of shards on the storage appliance in response to the at least one predetermined characteristic associated with the data set being cached and the requirement of the service level agreement.

13. The computer program product of claim 10, wherein the computer readable program code further comprises computer readable program code configured to tag the data set based on at least one of the at least one predetermined characteristic associated with the data set and a requirement associated with a service level agreement.

14. The computer program product of claim 10, wherein the computer readable program code further comprises computer readable program code configured to tag the data set for caching in one of the primary shard and the secondary shard based on the at least one predetermined characteristic associated with the data set.

15. The computer program product of claim 10, wherein the computer readable program code further comprises computer readable program code configured to tag the data set for caching in one of the primary shard, the secondary shard and another shard based at least on the at least one predetermined characteristic associated with the data set and the requirement associated with the service level agreement.

16. The computer program product of claim 15, wherein at least one of the predetermined characteristic associated with the data set and the requirement of the service level agreement comprise at least one of a predefined level of persistence and a predefined speed for accessing the data set cached on the storage device appliance and wherein the primary shard comprises a higher level of persistence and a higher access speed than the secondary shard.

17. The computer program product of claim 10, further comprising:
computer readable program code configured to determine if the data set requires a higher level of performance than a level of performance of the one of the plurality of shards in which the data set is currently cached;
computer readable program code configured to promote the data set to a shard of the plurality of shards that performs at the higher level of performance than a shard in which the data set is currently cached in response to the determination that the data set requires the higher level of performance; and
computer readable program code configured to migrate a secondary data set corresponding to the promoted data set to a next higher level performing shard than a shard in which the secondary data is currently cached, wherein the shard to which the secondary data set is promoted performs at a lower level than the shard to which the promoted data set is migrated.

18. A system, comprising:
a storage appliance for storing data;
a plurality of shards on the storage appliance, wherein each one of the shards comprises a different type of storage device including a different at least one performance feature, each different at least one performance feature of the different types of storage devices corresponding to a different at least one predetermined characteristic associated with a particular set of data, wherein the plurality of shards comprises:
a first shard named shard 1;
a second shard named shard 2, wherein the at least one performance feature of shard 1 comprises a higher level persistence and a faster data access speed than the at least one performance feature of shard 2;
a module for tagging a data set with a particular tag designation of a plurality of tag designations before caching, the particular tag designation identifying one of the plurality of shards by name in which the data set is to be cached based on the at least one predetermined characteristic associated with the data set, the plurality of tag designations each identifying one of the plurality of shards by a different name; and
wherein the data set is cached in a particular one of the plurality of shards on the storage appliance based on the tag designation, the at least one performance feature of the particular one of the plurality of shards corresponding to the at least one predetermined characteristic associated with the data set being cached.

* * * * *